(12) United States Patent
Mastracci et al.

(10) Patent No.: US 12,182,594 B2
(45) Date of Patent: *Dec. 31, 2024

(54) CAPTURING AND PROCESSING INTERACTIONS WITH A USER INTERFACE OF A NATIVE APPLICATION

(71) Applicant: FullStory, Inc., Atlanta, GA (US)

(72) Inventors: Matthew Mastracci, Calgary (CA); Joel Grayson Webber, Marietta, GA (US); Michael Morrissey, Atlanta, GA (US); Hollis Bruce Johnson, Jr., Atlanta, GA (US)

(73) Assignee: FullStory, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,924

(22) Filed: Jan. 31, 2023

(65) Prior Publication Data

US 2023/0251878 A1 Aug. 10, 2023

Related U.S. Application Data

(63) Continuation of application No. 17/533,750, filed on Nov. 23, 2021, now Pat. No. 11,593,131, which is a continuation of application No. 16/710,743, filed on Dec. 11, 2019, now Pat. No. 11,216,288, which is a continuation of application No. 16/038,002, filed on Jul. 17, 2018, now Pat. No. 11,036,524.

(60) Provisional application No. 62/650,841, filed on Mar. 30, 2018, provisional application No. 62/534,036, filed on Jul. 18, 2017.

(51) Int. Cl.
*G06F 17/00* (2019.01)
*G06F 3/048* (2013.01)
*G06F 9/451* (2018.01)

(52) U.S. Cl.
CPC .............. *G06F 9/451* (2018.02); *G06F 3/048* (2013.01)

(58) Field of Classification Search
None
See application file for complete search history.

(56) References Cited

U.S. PATENT DOCUMENTS

| | | |
|---|---|---|
| 6,151,033 A | 11/2000 | Mihara et al. |
| 6,778,983 B1 | 8/2004 | Bates et al. |
| 9,063,803 B1 | 6/2015 | Lewkovitz |
| 9,154,365 B1 | 10/2015 | Henry |
| 9,766,769 B1 | 9/2017 | Webber et al. |
| 9,910,760 B2 | 3/2018 | Kiel et al. |
| 10,430,212 B1 | 10/2019 | Bekmambetov et al. |
| 11,036,524 B1 | 6/2021 | Mastracci et al. |
| 11,216,288 B1 | 1/2022 | Mastracci et al. |

(Continued)

*Primary Examiner* — Mustafa A Amin
(74) *Attorney, Agent, or Firm* — Fish & Richardson P.C.

(57) ABSTRACT

Methods, systems, and apparatus, including computer programs encoded on a computer storage medium, for evaluating interactions with a user interface of an application are disclosed. In one aspect, a method includes, for each of a plurality of different user sessions of a native application, accessing frame bundles that each include data representing content presented by a frame of a user interface of the native application at a given time. Each frame bundle includes at least a portion of a view tree of the native application used to generate the user interface at the given time and data specifying content presented by each view of the portion of the view tree. Based on the frame bundles, playback data are generated that present visual changes of the user interface corresponding to changes to the view trees.

20 Claims, 3 Drawing Sheets

(56) References Cited

U.S. PATENT DOCUMENTS

| | | |
|---|---|---|
| 11,593,131 B2 | 2/2023 | Mastracci et al. |
| 2010/0229112 A1 | 9/2010 | Ergan et al. |
| 2011/0191676 A1 | 8/2011 | Guttman et al. |
| 2012/0081378 A1 | 4/2012 | Roy et al. |
| 2013/0104041 A1 | 4/2013 | Seshagiri et al. |
| 2013/0132833 A1 | 5/2013 | White et al. |
| 2014/0280517 A1 | 9/2014 | White et al. |
| 2015/0071605 A1 | 3/2015 | Ogawa et al. |
| 2017/0139723 A1 | 5/2017 | Holland et al. |
| 2019/0342400 A1 | 11/2019 | Van Rotterdam et al. |
| 2022/0083353 A1 | 3/2022 | Mastracci et al. |

CAPTURING AND PROCESSING INTERACTIONS WITH A USER INTERFACE OF A NATIVE APPLICATION

CROSS-REFERENCE TO RELATED APPLICATIONS

This application is a continuation application of, and claims priority to, U.S. patent application Ser. No. 17/533,750, titled "CAPTURING AND PROCESSING INTERACTIONS WITH A USER INTERFACE OF A NATIVE APPLICATION," filed on Nov. 23, 2021, which is a continuation application of, and claims priority to, U.S. patent application Ser. No. 16/710,743, now U.S. Pat. No. 11,216,288, titled "CAPTURING AND PROCESSING INTERACTIONS WITH A USER INTERFACE OF A NATIVE APPLICATION," filed on Dec. 11, 2019, which is a continuation application of, and claims priority to, U.S. patent application Ser. No. 16/038,002, now U.S. Pat. No. 11,036,524, titled "CAPTURING AND PROCESSING INTERACTIONS WITH A USER INTERFACE OF A NATIVE APPLICATION," filed on Jul. 17, 2018, which application claims the benefit under 35 U.S.C. § 119 (e) of U.S. Patent Application No. 62/650,841, entitled "CAPTURING AND PROCESSING INTERACTIONS WITH A USER INTERFACE OF A NATIVE APPLICATION," filed Mar. 30, 2018 and claims the benefit under 35 U.S.C. § 119 (e) of U.S. Patent Application No. 62/534,036, now expired, entitled "CAPTURING AND PROCESSING INTERACTIONS WITH A USER INTERFACE OF A NATIVE APPLICATION," filed Jul. 18, 2017. The disclosures of the foregoing applications are incorporated herein by reference in their entirety for all purposes.

BACKGROUND

This specification relates to data processing and capturing/evaluating interactions with user interfaces of native applications.

User interfaces facilitate user interaction with various resources and applications. For example, user interfaces generally include various interactive elements that enable a user to input data (e.g., using text boxes), make data selections (e.g., using radio buttons, check boxes, or drop down menus), navigate to application pages (e.g., by interacting with an embedded link), and change visual aspects of the user interface (e.g., rotating a device, resizing a window, scrolling to other portions of an application page, or using zoom controls). User satisfaction with a given application can depend on the user's experience interacting with the user interface of the application.

SUMMARY

In general, one innovative aspect of the subject matter described in this specification can be embodied in methods that include for each of a plurality of different user sessions of a native application: accessing a plurality of frame bundles that each include data representing content presented by a frame of a user interface of the native application at a given time, each frame bundle including at least a portion of a view tree of the native application used to generate the user interface at the given time and data specifying content presented by each view of the portion of the view tree; and generating, based on the plurality of frame bundles, playback data that present visual changes of the user interface corresponding to changes to the view trees.

Other embodiments of this aspect include corresponding systems, apparatus, and computer programs, configured to perform the actions of the methods, encoded on computer storage devices.

These and other embodiments can each optionally include one or more of the following features. The native application can be an application developed for a given platform. The portion of the view tree of the native application for each frame bundle can include data included in one or more classes of the platform used to generate one or more respective views of the user interface.

Generating the playback data can include redrawing a user interface for each frame bundle in a sequence based on the given time for each frame bundle. Generating the playback data can include identifying changes to the user interface of the native application between a first frame of a first frame bundle and a second frame of a second frame bundle based at least on data of the view tree of the first frame bundle and the view tree of the second frame bundle and interpolating the changes to present a transition between the first frame and the second frame.

Generating playback data can include generating playback data that visually present user interactions with the user interface. The user interactions can include at least one of a pointer movement, a user click, a user tap, a user swipe, a zoom, a scroll, a focus, or a text entry.

The portion of the view tree of the native application of a first frame bundle of the frame bundles can include a set of views of the native application that includes content presented by the user interface of the native application. The portion of the view tree of the native application of a second frame bundle of the frame bundles can include only one or more views of the native application that changed between the frame of the first frame bundle and the frame of the second frame bundle. Generating the playback data that present visual changes of the user interface corresponding to changes to the view trees can include generating a presentation of the second frame using the one or more views of the native application that changed between the frame of the first frame bundle and the frame of the second frame bundle and each other view of the portion of the view tree of the native application of the first frame bundle.

In some aspects, at least a portion of the data specifying content presented by each view of the portion of the view tree can include content detected using instrumentation of an instrumentation module executing on a user device on which the native application is installed.

Particular embodiments of the subject matter described in this specification can be implemented so as to realize one or more of the following advantages. User interactions with a user interface of a native application can be remotely captured and evaluated without negatively impacting the user experience. Evaluation of the user interface can be used to modify the user interface to provide a better user experience. Evaluation of user interactions with the user interface can reveal difficulties that users have interacting with the user interface, and an application developer can playback each session of interest to evaluate how the user interface can be modified to reduce the difficulties users have interacting with the user interface. Customer service representatives can quickly resolve user inquiries regarding a user interface by playing back the user session that is the subject of the user inquiry. For example, the representatives can playback the user sessions in real time while interacting with a user (e.g., during a support call or online chat) to discuss the user sessions. Application developers are provided with information regarding the scope of user interaction with various user interface elements and/or the scope of various conditions (e.g., failed content loads or aborted user sessions) by aggregating information acquired from multiple user sessions.

A web interface (e.g., web browser or Web View) can be used to playback user sessions that occurred on other platforms (e.g., Android™, iOS™, or another OS). User sessions that occurred on different and incompatible platforms can be unified in the same playback, e.g., the same web interface, allowing for a common user interface to view otherwise incompatible data, and to enable the common user interface to playback and/or search across user sessions that occurred in different OS environments. By indexing user sessions based on the platform on which the user session occurred, users can identify which user sessions particular user actions, user inactions, and/or errors occurred or did not occur, further assisting users in evaluating user interfaces.

Technology described in this document can facilitate evaluation of user interactions with user interfaces using less bandwidth and/or fewer memory resources than would be required without these technologies. For example, less bandwidth and fewer memory resources are used by storing and transmitting data of view trees (or portions of view trees) that are used to present content that is viewable on a display rather than storing screenshots or video of the display itself.

One or more compression or pre-compression techniques can further reduce the amount of bandwidth and memory resources used to facilitate evaluation of the user interactions. For example, data of view trees can be encoded and stored in frame bundles periodically based on a specified time period. If only a portion of the view tree has changed from the previous view tree of a previously stored frame bundle, only the changed portion may be stored and transmitted to a server that generates playback data, reducing the amount of data stored and transmitted. In addition, if no (or fewer than a threshold number of) user interactions have been detected at the user interface of the application over a given time period, the time period with which view trees are encoded and stored can be increased to reduce the amount of data encoded, stored, and transmitted when there is less user activity with the application.

The system can identify images that are normally loaded by an application from the client device (e.g., each time the application is opened) and images that are downloaded from a network (e.g., the Internet) based on content of the application. By storing the images that are normally loaded by the application at the server that generates playback data or otherwise not transmitting the images from the user device to another device, bandwidth in providing images for playback can be reduced by only transmitting images that are downloaded from the network.

An instrumentation module can be used to collect and store data that describe content presented by a frame of a user interface of the application at a given time. By installing the instrumentation module in the build file of the application using a few lines of code, application developers are not burdened with modifying their applications' business logic and other important code to install the instrumentation module, reducing the chances of errors or unpredictable results being introduced to the application code. As such, the instrumentation module (e.g., a few lines of code) can be applied to a compiled native application, such that the source code of the native application need not be modified by an application developer to instrument the application with an application that is capable of capturing all aspects of a user interface and user interactions with that user interface.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
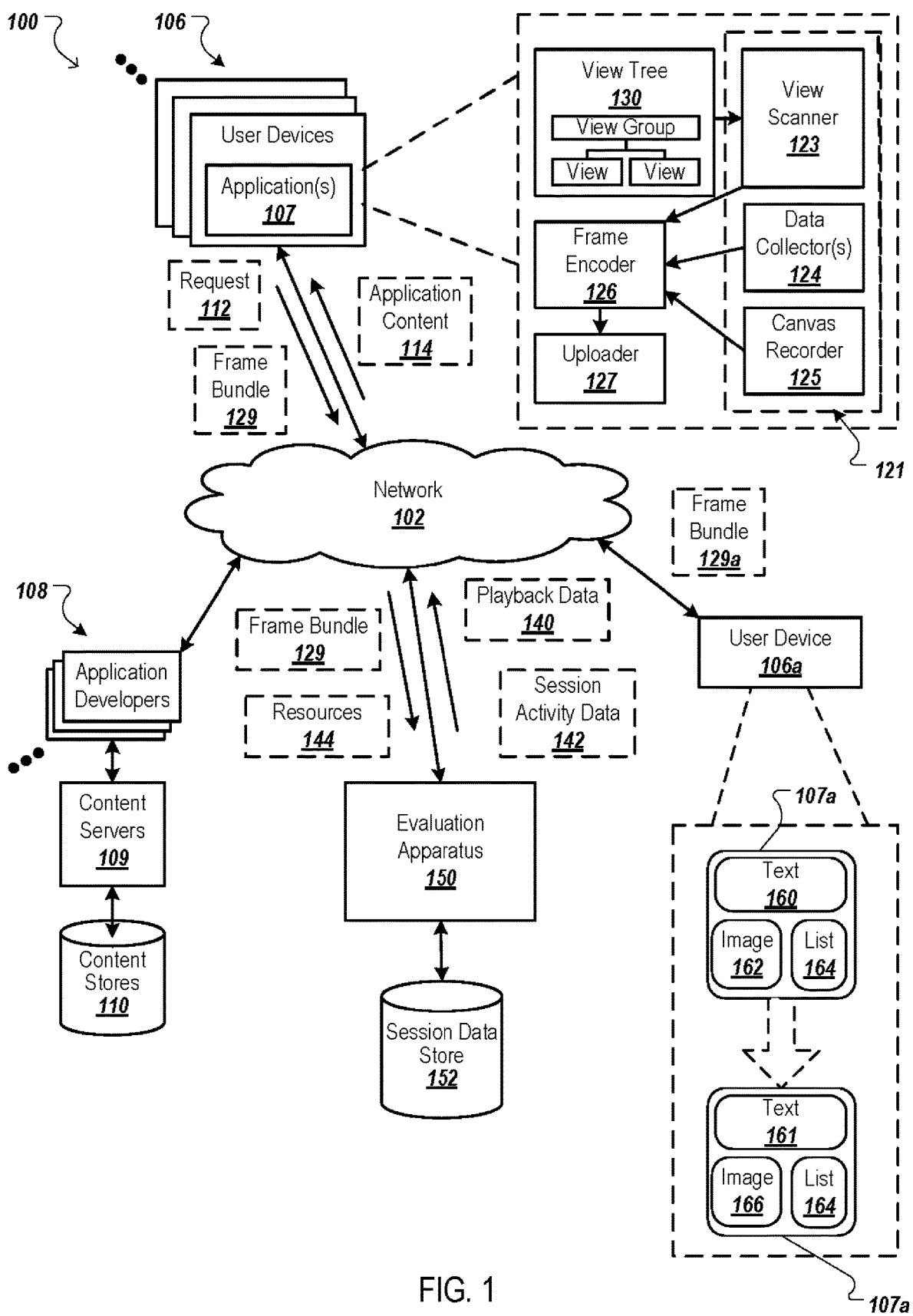
FIG. 1 is a block diagram of an example environment in which users interact with user interfaces.

Application developers generally want to create applications that have user interfaces that are user friendly so that users will have a positive experience. Having information about user interactions with a given user interface (e.g., an application interface) can help a publisher identify aspects of the user interface that can be changed to improve the user experience. This document discusses obtaining information related to user interactions with a user interface of an application (e.g., a native application installed on a mobile or tablet device) and processing that information to provide an application developer with data that the application developer can use to identify aspects of the user interface that may be modified to contribute to a positive user experience with the user interface. As discussed in detail below, the data provided to the application developer can include session activity data that describe user interactions with the user interface and/or playback data that present visual changes to the user interface during a given user session.

The playback data for a given application can include data that show mouse movements, mouse hovers, clicks, and other user interactions with the user interface, as well as changes to the user interface (e.g., content that was loaded and/or removed from the user interface) that occurred while a user was interacting with and/or viewing the application. Similarly, with respect to touch screen devices the playback data can include data that show swipes, taps, or other gestures that are performed (e.g., using a finger or pointer, such as a stylus or pen).

The session activity data can include an activity list that details various user interactions with various user interface elements while the user was interacting with and/or viewing the application. The session activity data can also include an activity report that can provide the application developer with an aggregate measure (e.g., total number or portion) of users the performed a specified interaction (e.g., performed a click on a specified button), an aggregate measure of users that failed to perform a specified interaction (e.g., not performing a click on a "continue" button), and/or aggregate measures of users that performed various combinations of interactions and failed to perform various combinations of user interactions.

As discussed below, the application developer is provided an interface that enables the application developer to request session information (e.g., session activity data and playback data) and playback user sessions that meet the criteria specified in the request. Thus, the application developer is provided information on how many (or what portion) of users performed (or didn't perform) one or more specified interactions, how many user sessions included a specified event, and/or view the playback of those user sessions.

In the description that follows, details for implementations in an Android™ environment are provided as examples. The techniques described herein can also be implemented in other environments, including iOS™ and other mobile and non-mobile environments.

FIG. 1 is a block diagram of an example environment 100 in which users interact with user interfaces. The example environment 100 includes a network 102, such as a local area network (LAN), a wide area network (WAN), the Internet, a mobile network, or a combination thereof. The network 102 connects user devices 106, application developers 108, and an evaluation apparatus 150. The example environment 100 may include many different user devices 106 and application developers 108.

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. A user device 106 can also include other applications 107, such as mobile applications that run on mobile devices. The mobile applications can include native applications developed for a particular platform or a particular device.

An application 107 can submit content requests 112 to the application developer 108 that developed the application over the network 102. For example, when a user opens the application 107, the application 107 can request images, text, videos, graphics, or other content to be presented by a user interface of the application. The application developer 108 can have one or more content servers 109 that provide application content 114 from one or more content stores 110 (e.g., memory storage devices, such as hard drives, flash memory, etc.) in response to the content requests. An application 107 can also store content at the user device 106. For example, text, images (e.g., of icons or logos), and other types of content that are typically presented each time (or at multiple times) the application 107 is opened can be stored at the user device 106 at which the application 107 is installed or executed. This content can either be stored temporarily or for as long as the application is installed at the user device 106.

An application 107 can include an instrumentation module 121 that collects data representing content presented by a user interface of the application 107 and provides the data to an evaluation apparatus 150. In some implementations, the instrumentation module 121 is a plug-in to application 107 that is launched when (or before) the application 107 is launched. Specifically, the instrumentation module 121 can be a separate application that is provided by a third-party (e.g., different from an entity that provides the application) and collects the data representing the content presented by at the user interface while the application 107 is running on the user device 106. While running, the instrumentation module 121 can collect the data and store the data at the user device 106. As described in more detail below, a frame encoder 126 can encode and/or compress the data and an uploader 127 can transmit the encoded/compressed data to the evaluation apparatus 150, e.g., in the form of one or more frame bundles 129.

In some implementations, an application developer 108 (or another entity such as an entity associated with the evaluation apparatus 150) can cause the instrumentation module 121 to be launched by an application 107 by including a few lines of code in a build file for the application 107 (e.g., rather than having to instrument the source code of the application 107). For example, the code can identify where the instrumentation module 121 module can be found (e.g., a URL for the location of the instrumentation module 121) and/or code that instructs a build system to include the instrumentation module 121 in the application 107. An example of code that may be included in the build code of an application developed for Android™ is provided below:

```
buildscript {
  repositories
    {jcenter( )
    maven {url "http://maven.example.com"}
  }
[ . . . more buildscript . . . ]
}
apply plugin: 'com.android.application'
apply plugin: 'exampleinstrumentationmodule'
```

The example code "maven {url "http://maven.example.com"}" can identify the location of the network location of the instrumentation module 121. The example code "apply plugin: 'exampleinstrumentationmodule'" can instruct a build system to include the instrumentation module 121 in the application 107. The code included in the build file for an application 107 can manipulate the build of the application 107, e.g., to cause the application 107 to launch the instrumentation module 121 when the application 107 is launched. The code can also automatically (e.g., independent of human interaction) manipulate the build of the application 107 to include instrumentation code in the application 107 for collecting data describing events that occur at user interfaces of the application and data describing content presented by user interfaces of the application 107.

To obtain appropriate data for playback, different instrumentation techniques may be used for different types of data or data that is gathered from different locations. For example, some public or protected data may be obtained from the platform's application programming interface (API) like a normal customer of the API. Some data may be package-protected or protected in a place where the instrumentation module 121 cannot access the data. In such cases, a Violator class may be created to work around the protection. Some data may be inaccessible using standard means, e.g., standard Java means, but reflection can be used to obtain the data. In some cases, in which reflection may not work properly, the methods can be instrumented or "hooks" can be placed into the virtual machine to hook methods, e.g., methods marked as native.

The instrumentation module 121 includes a view scanner 123, one or more data collector(s) 124 that each collect particular types of data, and a canvas recorder 125. These components of the instrumentation module 121 can periodically collect data for a current frame of the application's user interface and store the data one a frame by frame basis. For the purposes of this document, a frame represents a state of the user interface at a given point in time. For example, the user interface can change as a user interacts with the application and each frame can represent the state of the user interface at a respective given point in time. In some implementations, each component can collect its data a given number of times per second. Each time data is collected, the combined data is for a particular frame of the user interface of the application and can be stored in a frame bundle 129 for the particular frame. A frame bundle 129 is a collection of data for a given frame and can include data that represents the content displayed by the user interface for a particular frame.

The instrumentation module 121 can obtain data from the public API for each frame for which data is collected. This data can include the position on the screen of various views (e.g., various view of the view tress described below), whether a view is tagged with a particular identifier, text obtained from text views, etc.

Some data can be collected from virtual machines used to execute the application 107. To hook a virtual machine to obtain data for playback, the body of a method can be replaced or augmented with instrumentation and a call to the original method. A method in programming, e.g., object-oriented programming (OOP), is a procedure associated with a message and an object. An object is mostly made up of data and behavior, which form the interface that an object presents to the outside world. Data is represented as properties of the object and behavior as methods. In programming, a hook is a place and usually an interface provided in packaged code that allows a programmer to insert customized programming. For example, a programmer might want to provide code that analyzed how often a particular logic path was taken within a program.

In some implementations, the instrumentation module 121 can place the hooks at implementation time (e.g., after the application has been launched but before/during the application runtime) using one or more reflection techniques. In general, a method handle is an opaque handle that points to a structure in memory containing virtual machine information about that method. The structure typically includes a pointer to the native method registered for the structure. Given this configuration, a class can include native methods that can be registered and that can point to arbitrary methods for which the address is known. The instrumentation module 121 can scan the memory pointed to by the method handle for the registered addresses. This allows the instrumentation module 121 to read what the current native method is for a given method, e.g., a given Java method. With this data, the instrumentation module 121 can include a shim in native methods using shims that call the native method, then call instrumentation code with the results of the native method. In general, a shim is a library that can intercept API calls and handles the call itself or redirects the call elsewhere. This shim technique for native methods allows the instrumentation module 121 to receive notification when a method is called and to use the operations/ arguments of the method for use in playback.

Native methods can be instrumented using these shim techniques to associate image data or files (e.g., bitmaps) with resource names. In an Android™ implementation, the instrumentation module 121 can instrument the openNonAssetNative method (e.g., to obtain an integer handle associated with a file) and instrument the nativeDecodeAsset method which associates the integer handle with a realized Bitmap. The instrumentation can be called after the method returns. In this example, the instrumentation module 121 can receive the input parameters (e.g., open the file with the name "XYZ") and the output return value (e.g., the handle for file "XYZ" is 123). The filename passed into openNonAssetNative is associated with the number returned from that method (the handle). The handle is then associated with the bitmap returned from nativeDecodeAsset. This provides a bitmap to filename association or mapping.

In some implementations, the view scanner 123 is a thread that is initialized by the instrumentation module 121 when the instrumentation module 121 is launched by the application 107. The view scanner 123 can obtain data from the view trees 130 of the application 107.

The view trees 130 can include a hierarchy of view groups and individual views used to generate a user interface of an application. For example, a view may be a text view or an image view, and a view group may include multiple views such as a text view and an image view. Each view can specify a class that implements the view and attributes (e.g., dimensions, type or font of text, metadata, etc.) of the class for the particular instance of the class. The view scanner 123 can identify, from the view tree 130 for the application 107 at a given time, the views that are presented in the user interface of the application 107 and the contents of each view based on the data included in the view tree 130.

The view scanner 123 can iterate through each of the top-level windows and iterate through each view attached to each window, e.g., in depth-first order. For each view, the view scanner 123 can collect data such as the position on the screen of the view, alpha transparency of the view, view transform, and other appropriate data. As described below, the canvas recorder 125 can capture the contents of each view.

The view scanner 123 can also identify and discard clipped views, e.g., views that are not viewable or that are obstructed by other views. For example, an application 107 may have a number of layered views onscreen at a given time. In some cases, large portions of the view tree are completely obscured by other portions of the view tree. The view scanner 123 can identify the views that are completely obscured based on the size, location, and hierarchy of the views within the window. The view scanner 123 can exclude data for completely obscured views as those views are not presented at the user device display and would not be required for accurate playback. This reduces the amount of stored data and the amount of data transmitted to the evaluation apparatus 150, which reduces the amount of consumed network bandwidth and memory resources of the user device 106 and the evaluation apparatus 150.

The output of the view scanner 123 can be stored in a temporary storage location. For example, the output of the view scanned 123 can be stored in a temporary cross platform buffer or library, e.g., FlatBuffer. The temporary FlatBuffer can then be stored in a current frame bundle 129 in a thread that does not block the main user interface. Other types of collected data for a given frame of the user interface of the application can also be stored in the FlatBuffer.

For each view that is tracked by (e.g., each view for which data is obtained by) the view scanner 123, the canvas recorder 125 can obtain data describing the contents of the views that are displayed by the user device 106. In some implementations, the canvas recorder 125 is a subclass of a canvas class. For example, if the application 107 is an Android™ application, the canvas recorder 125 may be a subclass of the Android™ Canvas class that records data to a binary buffer internally. While a canvas subclass can be passed into a drawing method (e.g., onDraw ( ) of Android™), the application 107 may include some drawing logic scattered elsewhere, e.g., in other drawing methods such as dispatchDraw and/or drawChild methods of Android™.

The canvas contents can be encoded in a canvas buffer. The canvas buffer may be a binary buffer with a custom byte-based binary format. The canvas buffer can include a list of operations. Each operation can include a list of token bytes, followed by raw data encoded for that token. For example, an operation may be DRAW_RECT to draw a rectangle and DRAW_RECT may be followed by a DESTINATION_RECT token which would then be followed by an encoding of the rectangle.

Draw methods can be instrumented with one or more reflection techniques at instrumentation time to capture drawing code of the methods so that the code can be used to determine what was drawn on the display using the draw method. For example, Android™ draw methods such as dispatchDraw and drawChild can be instrumented in ViewGroupRewriter by generating fsSuperDispatchDrawStub and fsSuperDrawChild. For example, the instrumentation module 121 can instrument ViewGroupRewriter using one or more reflection techniques at instrumentation time. If the method has not implemented a draw method, e.g., a drawChild or dispatchDraw method, a missing method can be implemented with a stub that calls a generated stub from the previous step. In general, a stub is code that can be used to perform the functionality of another piece of code. If the method has been implemented, the calls to the draw methods, e.g., super.dispatchDraw or super.drawChild, can be replaced or augmented with the appropriate stub method. With the draw instrumentation in place, the draw method (e.g., dispatchDraw) can be called on the instrumented ViewGroup class to capture all of the drawing code in these methods.

Some applications use draw functions to render bits of the control rather than onDraw. These views can be detected at instrumentation time and a shim can be inserted that allows the canvas recorder 125 to call draw ( ) without the method being able to call super.draw. This is the same as the dispatchDraw stub described above.

Certain classes may be used by a platform for drawing lines, geometric shapes, icons, and spinners. For example, the Android™ Path class may be used for these objects. A path is effectively a list of verbs and points, such as moveTo, lineTo, quadTo, cubicTo, and close. There may also be higher level methods on a path to draw circles, rectangles, and other shapes that typically break down into the primitive verbs. For modern versions of Android™, the instrumentation module 121 can use an internal API (Path.approximate) to break down paths into the primitive verbs.

For older Android™ implementations (e.g., prior to version 5.0), the Path.approximate method does not exist, but another class named Picture is available. This allows the instrumentation module 121 to record a set of operations and then play them back in another canvas. The Picture class also allows the instrumentation module 121 to write the operations to a stream using a method. Thus, for older Android™ implementations, the instrumentation module 121 can determine the layout of the binary Picture format by serializing a test path whose values are known ahead of time. For each path that will be serialized, the instrumentation module 121 draws it to a picture. Then, using the layout information, the instrumentation module 121 can extract the path's verb and point components. The instrumentation module 121 can reorder and write the components to the FlatBuffer (or another storage location) in a consistent format. For example, the instrumentation module 121 can monitor for objects to be drawn using these paths and, if one is detected, include the verb and point for the path in the FlatBuffer for the given frame in which the object was drawn. In this way, the evaluation apparatus 150 can redraw the object for the given frame during playback.

Some applications use custom typefaces rather than, or in addition to, standard fonts. To track when custom typefaces are used, the instrumentation module 121 can (e.g., at instrumentation time) instrument classes with an instruction filter in the application 107 to identify calls to particular typeface objects. For example, in an Android™ implementation, the instruction filter may search classes for calls to Typface.createFromAsset and Typface.create. These calls may be replaced with a call to an equivalent instrumentation logging method. Using the instrumentation, the instrumentation module 121 can receive the return values from these calls in order to assign a typeface to a given string asset name for a given string of text presented by the application 107.

Each time a text operation on a canvas is initiated, the instrumentation module 121 can obtain the asset identifier for that typeface and store it in the frame bundle (e.g., initially in the FlatBuffer) for the frame in which the text operation was initiated. The evaluation apparatus 150 can use the data to load the correct typeface for the text operations at playback.

A similar process can be used to capture application logging activity. For example, the instrumentation module 121 may use an instruction filter that identifies calls to Log.{d,e, etc.} in classes and augments the calls with a call to an equivalent instrumentation logging method, e.g., using a shim.

The instrumentation module 121 can also detect clicks (which for brevity is intended to include taps or presses on a touch screen throughout this document) at a user interface of an application 107. In Android™, a click is anything that causes an OnClickHandler function to be triggered. In general, these functions are triggered in concert with a transition of the "pressed" state of a view from a false to a true or true to false. Thus, a click may be defined in instrumentation code as a transition of the pressed state in either direction.

The instrumentation module 121 can use one or more reflection techniques and view hierarchy scanning to detect transitions of the pressed state. When a pointer up/down event is dispatched, the instrumentation module 121 enters the click phase of event detection. Before the event is dispatched, the instrumentation module 121 can capture the pressed and unpressed state of each view in the hierarchy of the view tree. After the event is dispatched, the instrumentation module 121 can compare the pressed and unpressed state of each view to determine whether any of the states changed for any of the views. Each time a window of the application is opened, the instrumentation module 121 can hook its handler with an implementation that can be controlled by the instrumentation module 121. This allows the instrumentation module 121 to obtain access to deferred actions posted to event queues by views. If a runnable entity (a sequence of instructions that can be initiated by the runtime environment) if posted to the event queue during the click phase, the instrumentation module 121 can instrument the runnable with a wrapper to determine whether the pressed state of the view changed during the call. Table 1 below illustrates how the instrumentation module 121 determines whether a press occurred or a full click occurred based on the detected event and the transition direction of pressed to unpressed or unpressed to pressed.

TABLE 1

|  | Pressed -> Unpressed | Unpressed -> Pressed |
| --- | --- | --- |
| During down event | None | Press |
| During up event | Click | Press = Click |
| During deferred runnable | Click | Press |

In each case, the instrumentation module 121 attempts to determine the most specific visible element that transitioned from pressed to unpressed (or vice versa), as the pressed state may propagate up parent elements. In some implementations, the instrumentation module 121 evaluates the pressed state of each view. If the pressed state is true (i.e., the view was pressed), the instrumentation module 121 evaluates each child view of the view to identify the most specific view that has no pressed children (e.g., the pressed state of each child view of the view is false).

In some implementations, the instrumentation module 121 can use call stack peeking techniques to obtain data. For example, call stack peeking can be used for some method callers. As the instrumentation module 121 may not have control of the call sites and therefore may not instrument them (e.g., if the call sites are in an SDK), the instrumentation module 121 can obtain data from the call stack using a stack trace, e.g., a Java stack trace.

The data collectors 124 can collect other types of data that can be useful for indexing session activity data and/or for generating playback data for the application 107. For example, one or more data collectors 124 can collect environment data for the user device 106 and/or the application 107. Example environmental data can include whether the user device 106 was connected to a network, what type of network connection (e.g., Wi-Fi, mobile, etc.), screen brightness for the user device display, and/or sensor data for one or more sensors of the user device (e.g., accelerometer, gyroscope, etc.) For example, accelerometer and/or gyroscope data can be used to determine whether the user appeared frustrated while interacting with a user interface of the application.

The data for the application 107 can be collected and indexed for given views of the application's user interfaces. For example, as described above, the instrumentation module 121 may collect the data periodically based on a specified time period. Each time data is collected, the data can be for a given frame of the user interface. For example, the instrumentation module 121 can obtain data that describes the content presented by the application's user interface for a given number of frames per second. The data for each frame can include the view tree data, the canvas data, environmental data, click data, and/or other data described above. The data for a given frame can be stored in a frame bundle 129 and transmitted to the evaluation apparatus 150.

In some implementations, the instrumentation module 121 can attempt to map attributes of application views to Cascading Style Sheets (CSS) selector parts to support playback in a web browser. This also supports the ability to search for session activity data that includes particular attributes. For example, the instrumentation module 121 can assign the name of a class (e.g., Java class) implementing a particular view to a CSS tagname. In this example, the Java package name for the class can be moved into the package attribute of a CSS.

In another example, the instrumentation module 121 can assign a string ID specified for a class (e.g., an Android™ class) in the layout to a CSS ID. If a view has a string tag associated therewith, the string tag can be placed in a virtual tag attribute of a CSS.

In another example, the package name (e.g., Java package name) for a view class can be placed in a virtual package attribute of a CSS. For example, android.widget.TextView's package attribute can be "android.widget" in a CSS.

For view that are derived from TextView, the instrumentation module 121 can derive an HTML-like type attribute from the TextView's getInputType ( ) result and whether it has a PasswordTranformationMethod associated with its getTransformationMethod ( ) result. If a view is derived from TextView, the instrumentation module 121 can call the view's getUrls ( ) method to extract any associated URLSpan text chunks. If the view has at least one URLSpan text chunk, one of the text chunks (e.g., the first one) can be placed into a virtual "href" attribute of a CSS.

A frame encoder 126 can encode and/or compress data for frames prior to transmitting the data to the evaluation apparatus 126. For example, the frame encoder 126 can encode the data for each frame using binary encoding. The frame encoder 126 can pre-process at least some of the data prior to encoding or after encoding. For example, only a portion of a view tree may change from a first frame to a subsequent frame. The frame encoder 126 evaluate the view trees to identify each view that changed from the first frame to the subsequent frame. Rather that provide data of the entire view tree for both frames, the frame encoder 126 can include data of the view tree for the first frame. For the subsequent frame, the frame encoded 126 can provide data of the views that changed relative to the views of the first frame.

Similarly, if a canvas buffer for a given view has not changed between frames, the binary encoding of the previous frame can be used for the subsequent frame without having to transmit the same binary encoding to the evaluation apparatus 150 multiple times, thereby reducing the amount of data encoded and transmitted.

The frame encoder 126 can also compress strings of text. For example, it may be more efficient to encode strings of text in a separate string table and reference the strings using an identifier, e.g., a 32-bit identifier, than to send the original strings of text.

After compressing the data for a frame using one or more of the above techniques, the data for a frame can be further compressed using naive compression or other compression techniques. In this way, the network bandwidth consumption is reduced and the amount of memory resources of the user device 106 and the evaluation apparatus 150 used to store the frame data can be reduced.

After compressing the data for a frame, the data can be aggregated in a frame bundle 129 can transmitted by an uploader 127 to the evaluation apparatus 150. The evaluation apparatus 150 can store each frame bundle 129 in a session data store 152 and use the data to generate playback data and session activity data, as described below.

Another bandwidth and memory saving technique includes identifying images, e.g., bitmaps, that are sourced from resources (which may be accessed ahead of time) and images that are sourced from dynamic locations (e.g., from the Internet or an internal API). For example, images sourced from resources may be presented by the application each time (or at least multiple time) the application 107 is opened. These images can include logos, icons, graphics, etc. Images sourced from dynamic locations can include images specific to a particular time at which the application 107 is opened (e.g., a weather image for current weather, recent social networking images included in a user's news feed), a current location of the user device 106, etc. To avoid transmitting all images from an application 107 to the environmental apparatus 150, at least a portion of the images sourced from resources can be stored at the environmental apparatus 150. In this way, an identifier for the images can be transmitted from the user device 106 to the environmental apparatus 150 rather than the images themselves.

To assign images with an identifier, the instrumentation module 121 can instrument one or more virtual machines to detect native methods used to load images sourced from resources for the application 107. For an Android™ application, the instrumentation module 121 can hook methods on android.content.res.AssetManager and android.graphics. BitmapFactory. For example, the instrumentation module 121 can track the asset handle returned from the method AssetManager.openNonAssetNative (int cookie, String filename, int accessMode) to obtain the filename string and use the filename string as the identifier for the image.

The instrumentation module 121 can also close the handle associated with AssetManager.destroy Asset (int handle) to clean up tracking information. The instrumentation module 121 can also hook the method BitmapFactory.nativeDecodeAsset (int handle, Rect padding, Options ops). This method takes a handle and a set of options and returns a bitmap. The instrumentation module 121 can assign the bitmap to its filename passed into openNonAssetNative. The instrumentation module 121 can use similar instrumentation to obtain file names and identifiers for images from other Android™ methods and similar methods of other platforms.

For images that are sourced from a resource rather than a dynamic location, the instrumentation module 121 can include an identifier (e.g., the file name) for the image in the frame bundle 129 for the frame in which the image is presented. The evaluation apparatus 150 can then obtain the image from storage and present the image in playback data using the identifier.

The evaluation apparatus 150 receives the frame bundles 129 from the user device and generates, for each user session, playback data 140 and session activity data 142 for the user session. The evaluation apparatus 150 can provide the playback data 140 and the session activity data 142 to the application developer 108 that developed the application 109 at which the user session occurred.

The playback data 140 present the application developer 109 with visual changes to an application 107a during the user session and other user activity (e.g., mouse movements) that occurred during the session. At least a portion of the visual changes to the application 107a correspond to changes in view trees and the content presented for each view of the view tree during the user session. For example, the playback data 140 can show the application developer 109 pointer (e.g., mouser or finger) movement over the application 107a, a user click (including a tap or press) on an item from the list 164, and the replacement of the image 162 with the image 166. In this example, the replacement of the image 162 with the image 166 can correspond to change of an image view from presenting the image 162 in one frame to presenting the image 166 in a subsequent frame. Similarly, the replacement of text 160 with text 161 can correspond to a change in a text view of the view tree from presenting text 160 in one frame to presenting the text 161 in a subsequent frame.

The session activity data can present to the application developer 109 a list of events that occurred during the user session. For example, the list of events can specify that two events Ev1 and Ev2 occurred during the user session. Ev1 can correspond to the initial loading of the application 107a, and Ev2 can correspond to the click on the item from the list 164. As playback of the user session is presented (e.g., showing mouse movements and visual changes) the list of events can be highlighted to show which event corresponds to the visual changes that are being presented by the playback data. For example, upon initial playback of the user session, Ev1 can be highlighted indicating that the visual representation of the application 107a corresponds to the initial loading of the application 107a. Once playback of the user session reaches the point where the user clicked on the item from the list 164, Ev2 can be highlighted indicating that the replacement of the image 162 with the image 166 corresponds with the click on the item from the list 164. As discussed in more detail below, the session activity data can also include contextual data corresponding to the user click on the item from the list (e.g., text of the clicked item, which changes to the application 107a correspond to the user click, and/or requests for other application user interfaces that occurred during the user session.

The event evaluation apparatus 150 can create playback data 140 for a user session using the data in the frame bundles 129 received for the user session. In some implementations, the event evaluation apparatus creates the playback data 140 by redrawing each frame of the user session for which a frame bundle was generated in a canvas. For example, the event evaluation apparatus 150 can draw a frame by identifying each view for the frame and rendering each view in the canvas based on the data for each view included in the frame bundle 129 for the frame. For example, if the view tree for a frame includes a text view that includes text, the evaluation apparatus 150 can identify the text view and its display position from the view tree data, identify the text from the text table using an identifier for the text included in the canvas contents. If the text was rendered with a custom font, the evaluation apparatus can also use the typeface assigned to the text to render the text in its custom font. The evaluation apparatus 150 can then draw the text on the canvas using the data. The evaluation apparatus 150 can render other types of views, e.g., image views in a similar manner.

The evaluation apparatus 150 can also cause visual presentation of user interactions with the user interface. For example, the user interactions can include a pointer movement, a user click, a user tap, a user swipe, a zoom, a scroll, a focus, or a text entry. For a user swipe, the playback data 140 can include data that represent a path of the swipe over a period of time based on detected touch points in successive frame bundles 129. The evaluation apparatus 150 can interpolate the position of the swipe between frames based on the location of the swipe in successive frame bundles 129. For example, a location of a swipe may be at point A in a first frame represented by a first frame bundle and the location of the swipe may be at point B in a second frame immediately following the first frame. In this example, the evaluation apparatus may interpolate the location of the swipe between frames to present the swipe moving from point A to point B.

In some implementations, the evaluation apparatus 150 can interpolate other changes to the user interface between frames. For example, the instrumentation module 121 may collect data periodically based on a time period that is greater than time period between frames during playback. In a particular example, the instrumentation module 121 may collect data and generate a frame bundle five times per second and the playback may be presented at ten frames per second. In this example, the evaluation apparatus 150 can interpolate between each pair of successive frames to playback ten frames per second. For example, the evaluation apparatus 150 can interpolate scrolling, swipes, changes in view positions/size of views of the view tree, campus translations, changes in text, and/or other appropriate content.

In some implementations, the evaluation apparatus 150 presents playback data in a web browser environment. In this example, the evaluation apparatus 150 can translate the application's canvas to an HTML canvas. For example, the evaluation apparatus 150 can unpack FlatBuffer-encoded frame bundles to a script (e.g., JavaScript) format before playback. The evaluation apparatus 150 can playback a user session in real time, e.g., in a web browser, so that a customer service representative can view the playback while discussing the user session with a user of the user session.

The evaluation apparatus 150 can also generate session activity data 142 for at least some of the user interactions that occurred during the user session. The session activity data 142 can specify, for example, a list of various user actions (e.g., clicks, text entry, icons selected, etc.) that occurred and any environmental data (e.g., accelerometer data) corresponding to the user interaction.

Figure 2:
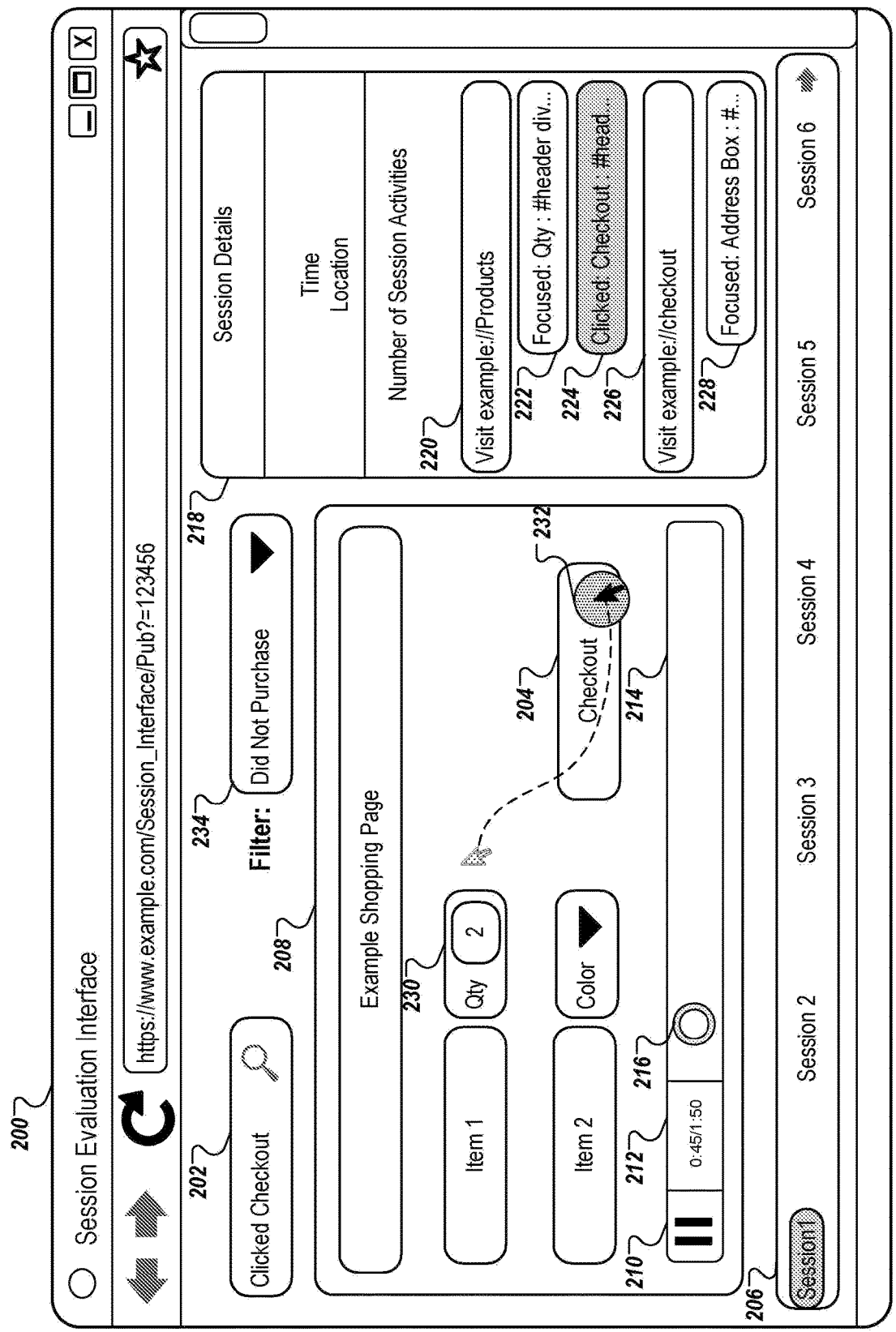
FIG. 2 is an illustration of an example user interface for replaying a session.

FIG. 2 is an illustration of an example user interface 300 for replaying a user session. The user interface 300 includes a search field 202 that receives search criteria for identifying sessions. For example, assume that an application developer is interested in identifying and/or viewing sessions during which a user clicked a checkout button 204 of a given native application. The user enters the search phrase "clicked checkout" in the search field 202. Upon submission of the search phrase (e.g., inputting and enter command or clicking on a submission button), a request for session information is transmitted to the evaluation apparatus 150, which may include a search apparatus. The request for session information can include, for example, the search phrase, and identity of the application developer requesting the session information, and/or other information that provides context associated with the request.

In response to receiving the request for session information, the evaluation apparatus 150 can use the search phrase "clicked checkout" to identify one or more sessions during which a user clicked the checkout button 204 of the given native application. In some implementations, the evaluation apparatus 150 identifies sessions responsive to the search phrase from an index of user sessions. For example, the index may include one or more entries associating the user action "click" and the user interface element "checkout button" with sessions during which a user clicked on the "checkout" button 204.

The evaluation apparatus 150 provides data identifying sessions responsive to the request for session information to the requesting device. In some implementations, the evaluation apparatus 110 can respond to the request for session information by providing data about one or more sessions that were identified based on the search phrase. Continuing with the example above, the evaluation apparatus 150 can provide a list of sessions 206 that were identified from the index based on the search phrase "clicked checkout." As illustrated by FIG. 2, the sessions in which a user clicked a checkout button include Session 1, Session 2, Session 3, Session 4, Session 5, and Session 6.

The evaluation apparatus 150 can also provide playback data and session activity data for one or more of the identified sessions in response to the request for session information. For example, as illustrated by FIG. 2, Session 1 is shaded, indicating that playback data for Session 1 is available for replay, and that session activity data for Session 1 are available for presentation.

The user interface 200 includes a playback region 208 in which previous sessions are replayed based on the playback data. The playback region 208 includes a playback bar, which includes a play/pause portion 210, a counter 212, and a slider portion 214. The play/pause portion 210 enables an application developer to start and stop replay of the session by interacting with the play/pause portion 210. The counter 212 provides a total duration of the session (e.g., 1 minute 50 seconds) and a portion of the session that is currently being presented (e.g., 45 seconds). The slider portion 214 enables an application developer to quickly move to other portions of the session by sliding a sliding element 216 within the slider portion 214. Continuing with the example above, the playback region 208 is replaying Session 1, as indicated by the shading of Session 1 in the list of sessions.

The user interface 200 includes a session activity region 218 in which activities that occurred during the session being replayed are presented based on the session activity data. For example, the session activity region 218 presents information such as a time at which the session being replayed occurred (e.g., a day, date, time of day, and/or year) and/or a geographic location of the user device at which the user session occurred. The session activity region 218 can also present a number of activities (e.g., a number of clicks, focuses, page navigations, or other user interactions) that occur during the session.

The session activity region 218 also identifies and/or outlines various activities that occurred during the user session being replayed. For example, the session activity region 218 specifies that, during the session being replayed in the playback region 208 the user navigated to application page example://products 220 of an example application, focused on a Qty element within the application page 222, clicked the checkout button 224, navigated to application page example://checkout 226, and focused on an address box 228. The activities listed in the session activity region 218 can be arranged in the order in which they occur during the session. For example, the activity 220 occurred prior to the activities 222, 224, 226, and 228. Additionally, the activities listed in the session activity region 218 can be visibly represented in a hierarchical manner. For example, each of the activities 222 and 224 are offset to the right relative to the activity 220, thereby indicating that the activities 222 and 224 occurred during the visit to application page example://products 220.

The list of activities 218 can also provide contextual data regarding the activity. For example, activity 222 indicates that the user interaction "focus" occurred with the Qty user interface element 230. The list of activities 218 can also provide environmental information associated with the activities. For example, if the accelerometer data indicates that the user device was being shaken when an activity occurred, the list of activities may include "frustrated."

As replay of the session proceeds in the replay region 208, activity corresponding to the portion of the replay being presented can be highlighted. For example, after the user focuses on the Qty element 230, the user clicked on the checkout button 204. As the replay shows the mouse moving from near the Qty element 230 to the checkout button 204 (as illustrated by the dashed line), the activity 224 can be shaded (or highlighted) indicating the session activity that corresponds to the portion of the session currently being replayed. When the replay of the session reaches a point at which the user clicked the checkout button 204, the playback data can cause a shaded circle 232 to be presented, thereby visually conveying to the publisher that the user click occurred and a location of the user click on the checkout button 204. Similar animations can be used to visually convey to the publisher that other interactions occurred. For example, with reference to a touchscreen device, a similar shaded circle can be used to visually convey the occurrence of a user tap, and elongated shading animation can be used to illustrate a user swipe or other finger movement on the touchscreen.

As discussed above, an application developer can request replay of one of the other sessions (e.g., Session 2) from the user interface 200 (or another user interface). For example, user interaction with (e.g., a click of) Session 2 in the list of sessions 206 can initiate a request for session information about Session 2. In response to the request, the evaluation apparatus 150 can output, to the requesting device, playback data and session activity data related to Session 2. Upon receipt of the playback data and session activity data, the requesting device can replay Session 2 in the replay region 208, and present information about the activities that occurred during Session 2 in the session activity region 218.

In some implementations, the user interface 200 can include a filter element 234. The filter element 234 and enables an application developer to filter sessions identified using, for example, the submitted search phrase. For example, an application developer may be interested in identifying only the sessions during which a user clicked on the checkout button 204, but did not ultimately make a purchase. In this example, the user can submit the search phrase "clicked checkout," and interact with the filter element 234 to select a filter that identifies only those sessions during which the user did not make a purchase (e.g., by clicking on a drop-down button and selecting the "did not purchase" option). This enables the application developer to quickly identify sessions of interest, and/or identify what might have prevented these users from making a purchase (e.g., issues with the user interface).

An example filter is provided here for purposes of illustration, but various other filters can be used and specified as desired. For example, publishers may be interested in evaluating only those sessions that were performed in a specific geographic region (e.g. Southeast United States, Central America, Europe) or only those sessions during which a user terminated the session prior to some specified duration (e.g., within 2 minutes). Providing filters such as these and/or analytic information related to sessions identified using filters can provide an application developer with insight regarding how to better format their user interface and/or achieve specific business goals (e.g., increase sales).

Figure 3:
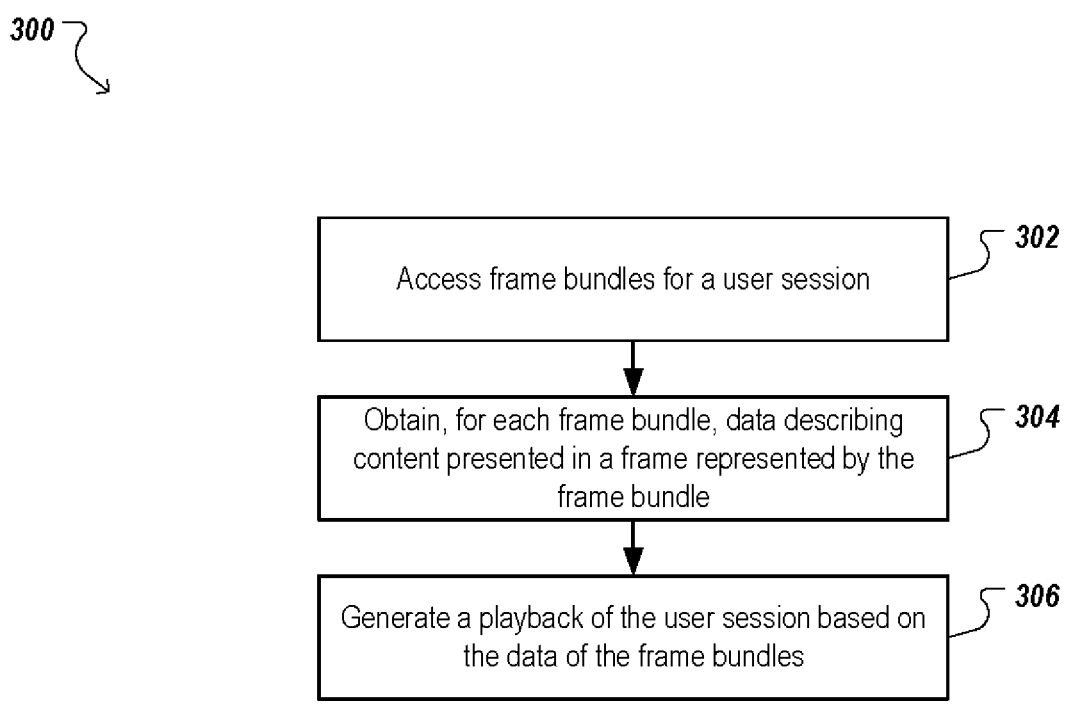
FIG. 3 is a flow chart of an example process for generating and outputting playback data.

FIG. 3 is a flow chart of an example process 300 for generating and outputting playback data. Operations of the process 300 can be performed, for example, by one or more data processing apparatus, such as the evaluation apparatus 150. Operations of the process 400 can also be implemented as instructions stored on a non-transitory computer readable medium. Execution of the instructions cause one or more data processing apparatus to perform operations of the process 300.

Frame bundles for a user session are accessed (302). In some implementations, an instrumentation module is launched at a user device when an application is opened. The instrumentation module can collect data for one or more displayed frames of the application's user interface during the user session with the application. For example, the instrumentation module can collect, for each frame, data of a view tree used by the application to generate the user interface, canvas data that specify contents of each view of the view tree, data describing events (e.g., user clicks, scrolls, swipes, selections of icons, etc.), and other data as described above.

The instrumentation module can encode and compress the data for each frame in a respective frame bundle. The instrumentation module can then transmit each frame bundle to an evaluation apparatus.

For each frame bundle, data describing content presented in a frame represented by the frame bundle is obtained from the frame bundle (304). For example, the views presented in the frame represented by a frame bundle and the content presented in the view can be obtained from a frame bundle. In some implementations, the data is decoded and/or translated for presentation in a web browser, as described above.

Playback data is generated based on the data included in the frame bundles (306). For example, each frame may be redrawn in a canvas (e.g., an HTML canvas) based on the data included in the frame bundle for the frame. In some implementations, additional frames may be generated by interpolating two consecutive frames, e.g., to meet a playback rate of a web browser in which the playback will be presented.

During or before playback, compressed data may be decompressed. For example, if a particular frame bundle includes only one or more changed views of a view tree that were changed from a prior frame, decompression can include using the view of the view tree of the prior frame in combination with the changed views to generate the playback of the frame for the particular frame bundle.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    initiating, at a client device, a user session with one or more user interfaces of an application running on the client device;
    initiating, at the client device, an instrumentation module for collecting event data for use in recreating playback of the user session at a computing device different from the client device;
    identifying a set of drawing functions of the application;
    modifying at least a subset of the drawing functions to send drawing data related to objects being drawn to a display of the client device to the instrumentation module, wherein the drawing data for at least one drawing function includes data that enables another computing system to redraw the object using data indicating the drawing function;
    for each frame of multiple frames of the user interface displayed during the user session:
        obtaining, by the instrumentation module, data representing a plurality of views drawn to a display of the client device to generate display of the frame; and
        obtaining, by the instrumentation module and for each view of one or more of the plurality of views, data specifying one or more drawing operations processed by the application to draw content of the view on the display of the client device, wherein, for views that include a modified drawing function of the subset of drawing functions, the data includes the drawing data received from the modified drawing function;
    generating the event data comprising, for each one or more of the multiple frames, the data representing plurality of views and the data specifying the one or more drawing operations; and
    sending the event data to the computing device.

2. The method of claim 1, wherein modifying the subset of drawing functions comprises replacing a drawing function with an instrumentation logging method.

3. The method of claim 1, wherein modifying the subset of drawing functions comprises modifying a drawing function using a reflection technique to capture drawing code of the drawing function.

4. The method of claim 1, wherein modifying the subset of drawing functions comprises adding a shim to intercept calls to the drawing function.

5. The method of claim 4, wherein the shim is configured to handle the calls to the drawing function or redirect the calls to the drawing function to another function.

6. The method of claim 1, wherein at least one drawing function comprises a drawing method.

7. The method of claim 1, wherein modifying the subset of drawing functions comprises associating image data with a resource name.

8. The method of claim 1, wherein modifying the subset of drawing functions comprises replacing a drawing method with a stub configured to perform functionality of the drawing method.

9. The method of claim 1, wherein modifying the subset of drawing functions comprises:
    detecting a drawing function configured to render bits; and
    inserting a shim that enables a canvas recorder class to call another drawing function.

10. The method of claim 1, wherein modifying the subset of drawing functions comprises augmenting a call to a drawing function with a call to an equivalent logging method.

11. The method of claim 1, further comprising identifying, for inclusion in the subset of the set of drawing functions, each occurrence of a drawing function in the application that is in a list of drawing functions into which a canvas recorder subclass is eligible to be passed.

12. The method of claim 1, wherein modifying the subset of drawing functions comprises instrumenting, by the instrumentation module, one or more drawing functions using one or more reflection techniques such that calls of each drawing function of the one or more drawing functions are replaced or augmented with a stub method that collects data related to calls of the drawing function.

13. A system, comprising:
    one or more processors of a client device; and
    one or more memories having stored thereon computer readable instructions configured to cause the one or more processors to perform operations comprising:
        initiating, at the client device, a user session with one or more user interfaces of an application running on the client device;
        initiating, at the client device, an instrumentation module for collecting event data for use in recreating playback of the user session at a computing device different from the client device;
        identifying a set of drawing functions of the application;
        modifying at least a subset of the drawing functions to send drawing data related to objects being drawn to a display of the client device to the instrumentation module, wherein the drawing data for at least one drawing function includes data that enables another computing system to redraw the object using data indicating the drawing function;
        for each frame of multiple frames of the user interface displayed during the user session:
            obtaining, by the instrumentation module, data representing a plurality of views drawn to a display of the client device to generate display of the frame; and
            obtaining, by the instrumentation module and for each view of one or more of the plurality of views, data specifying one or more drawing operations processed by the application to draw content of the view on the display of the client device, wherein, for views that include a modified drawing function of the subset of drawing functions, the data includes the drawing data received from the modified drawing function;
        generating the event data comprising, for each one or more of the multiple frames, the data representing the plurality of views and the data specifying the one or more drawing operations; and
        sending the event data to the computing device.

14. The system of claim 13, wherein modifying the subset of drawing functions comprises replacing a drawing function with an instrumentation logging method.

15. The system of claim 13, wherein modifying the subset of drawing functions comprises modifying a drawing function using a reflection technique to capture drawing code of the drawing function.

16. The system of claim 13, wherein modifying the subset of drawing functions comprises adding a shim to intercept calls to the drawing function.

17. The system of claim 16, wherein the shim is configured to handle the calls to the drawing function or redirect the calls to the drawing function to another function.

18. The system of claim 13, wherein at least one drawing function comprises a drawing method.

19. The system of claim 13, wherein modifying the subset of drawing functions comprises associating image data with a resource name.

20. A non-transitory computer readable medium storing instructions that upon execution by one or more computers cause the one or more computers to perform operations comprising:
- initiating, at a client device, a user session with one or more user interfaces of an application running on the client device;
- initiating, at the client device, an instrumentation module for collecting event data for use in recreating playback of the user session at a computing device different from the client device;
- identifying a set of drawing functions of the application;
- modifying at least a subset of the drawing functions to send drawing data related to objects being drawn to a display of the client device to the instrumentation module, wherein the drawing data for at least one drawing function includes data that enables another computing system to redraw the object using data indicating the drawing function;
- for each frame of multiple frames of the user interface displayed during the user session:
  - obtaining, by the instrumentation module, data representing a plurality of views drawn to a display of the client device to generate display of the frame; and
  - obtaining, by the instrumentation module and for each view of one or more of the plurality of views, data specifying one or more drawing operations processed by the application to draw content of the view on the display of the client device, wherein, for views that include a modified drawing function of the subset of drawing functions, the data includes the drawing data received from the modified drawing function;
- generating the event data comprising, for each one or more of the multiple frames, the data representing the plurality of views and the data specifying the one or more drawing operations; and
- sending the event data to the computing device.

* * * * *